United States Patent [19]

Delery, Jr. et al.

[11] Patent Number: 4,961,599
[45] Date of Patent: Oct. 9, 1990

[54] SEALING GLAND CONSTRUCTION FOR USE IN HYDRAULIC UNIT JOINTS

[76] Inventors: Oliver S. Delery, Jr., P.O. Box 50520, New Orleans, La. 70150; William T. Burt, 622 S. Lake View, Baton Rouge, La. 70810

[21] Appl. No.: 229,969

[22] Filed: Aug. 9, 1988

[51] Int. Cl.⁵ .............................................. F16L 21/02
[52] U.S. Cl. ................ 285/230; 277/207 A; 277/182; 277/184; 285/237
[58] Field of Search ............... 285/230, 231, 224, 225, 285/910; 277/207 A, 212 FB, 181, 182, 184

[56] References Cited

U.S. PATENT DOCUMENTS

| | | | |
|---|---|---|---|
| 1,847,676 | 3/1932 | Sherrerd et al. | 285/230 X |
| 2,314,386 | 3/1943 | Brend | 277/189 |
| 2,501,943 | 3/1950 | Jack | 285/163 |
| 3,147,014 | 9/1964 | Ohnstad | 277/207 A |
| 3,265,410 | 8/1966 | Lorang | 277/207 A X |
| 3,317,214 | 5/1967 | Durgom | 277/207 A |
| 3,368,830 | 2/1968 | French | 277/207 A |
| 3,493,236 | 2/1970 | Kleindienst | 285/230 X |
| 3,493,237 | 2/1970 | Kleindienst | 277/178 |
| 3,620,556 | 11/1971 | Paddington | 285/110 |
| 3,787,061 | 1/1974 | Yoakum | 277/164 |
| 3,830,530 | 8/1974 | Glover | 285/230 |
| 3,897,073 | 7/1975 | Swanson et al. | 277/229 |
| 4,084,828 | 4/1978 | Jones | 277/207 A |
| 4,103,901 | 8/1978 | Ditcher | 277/9.5 |
| 4,108,446 | 8/1978 | Lloyd | 277/101 |
| 4,121,845 | 10/1978 | Reynolds | 277/212 FB |
| 4,159,829 | 7/1979 | Ditcher | 277/189 |
| 4,325,587 | 4/1982 | Seigert | 277/212 FB X |
| 4,403,781 | 9/1983 | Riemscheid | 277/212 FB |
| 4,440,407 | 4/1984 | Gagas | 277/212 F |
| 4,449,720 | 5/1984 | Wolters et al. | 277/207 A |
| 4,602,793 | 7/1986 | Andrick | 277/207 A |

FOREIGN PATENT DOCUMENTS 93033 12/1959 Netherlands .................. 277/207 A

Primary Examiner—Allan N. Shoap
Attorney, Agent, or Firm—Richard P. Matthews

[57] ABSTRACT

A sealing gland construction for use in connection with hydraulic unit joints. Receptacles are provided at the joint for enlarged and compressible heads disposed on each end of the sealing gland. One receptacle is located on an inner wall of a female or bell end of one pipe and another receptacle is located on the exterior wall or a male or spigot end of an adjacent pipe. The enlarged heads of the sealing gland extend perimetrally around their associated female and male ends of the pipe and are adhesively secured within the receptacles. By making the compressible heads larger than the dimensions of the receptacle they are maintained under compression both horizontally and vertically. In the assembled joint position, the male end and its receptacle have been inserted into the female end past its receptacle so as to effect a fluid seal which is encased within the walls of said pipes and which remains sealed even in the event of a slight discoupling of the joint. In another embodiment, only the female pipe end is provided with a receptacle for an enlarged, compressible head. The opposite end of the sealing gland is clamped and adhesively secured to the male end. In the assembled position, the point of attachment is inserted beyond the receptacle in the female end to reach a comparable result.

11 Claims, 3 Drawing Sheets

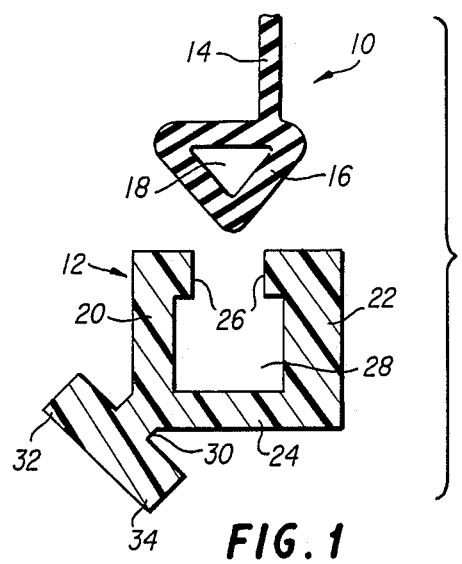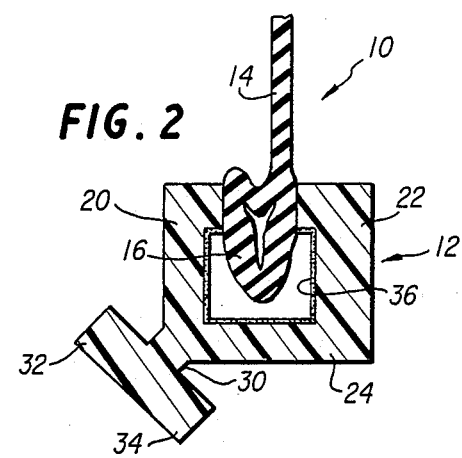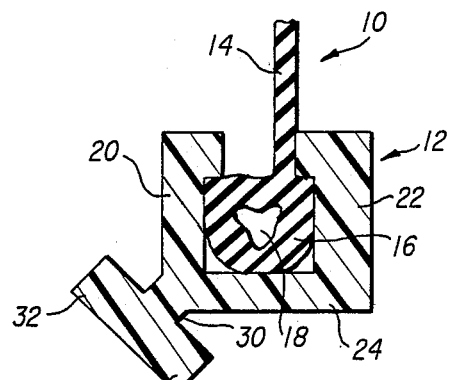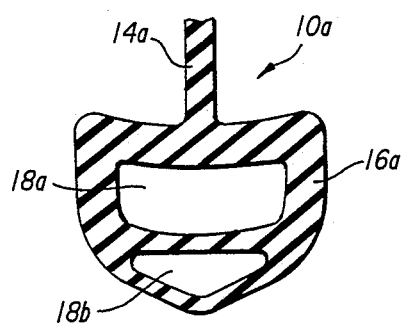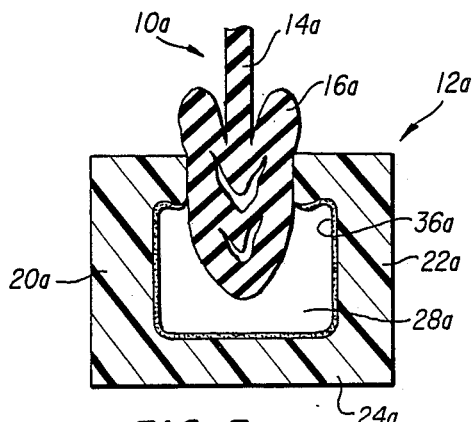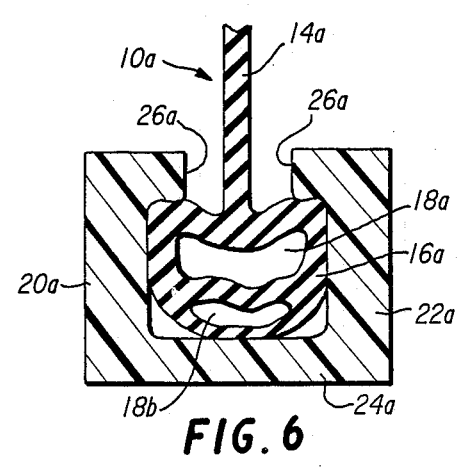

FIG. 8
FIG. 7
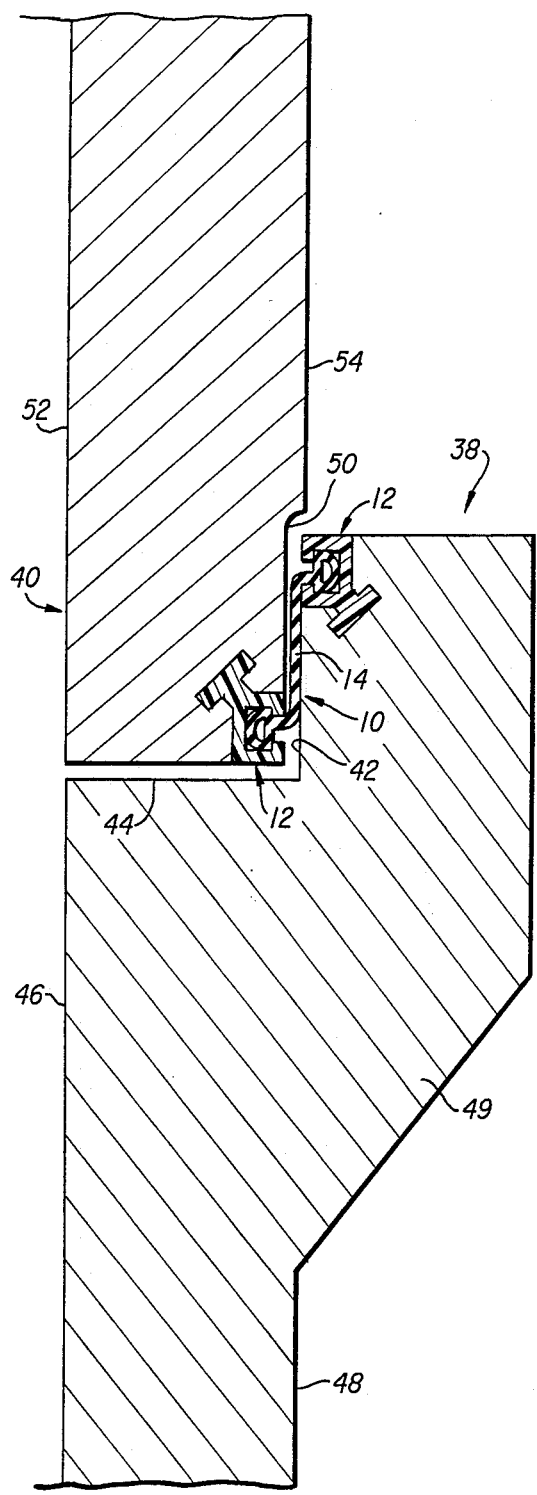
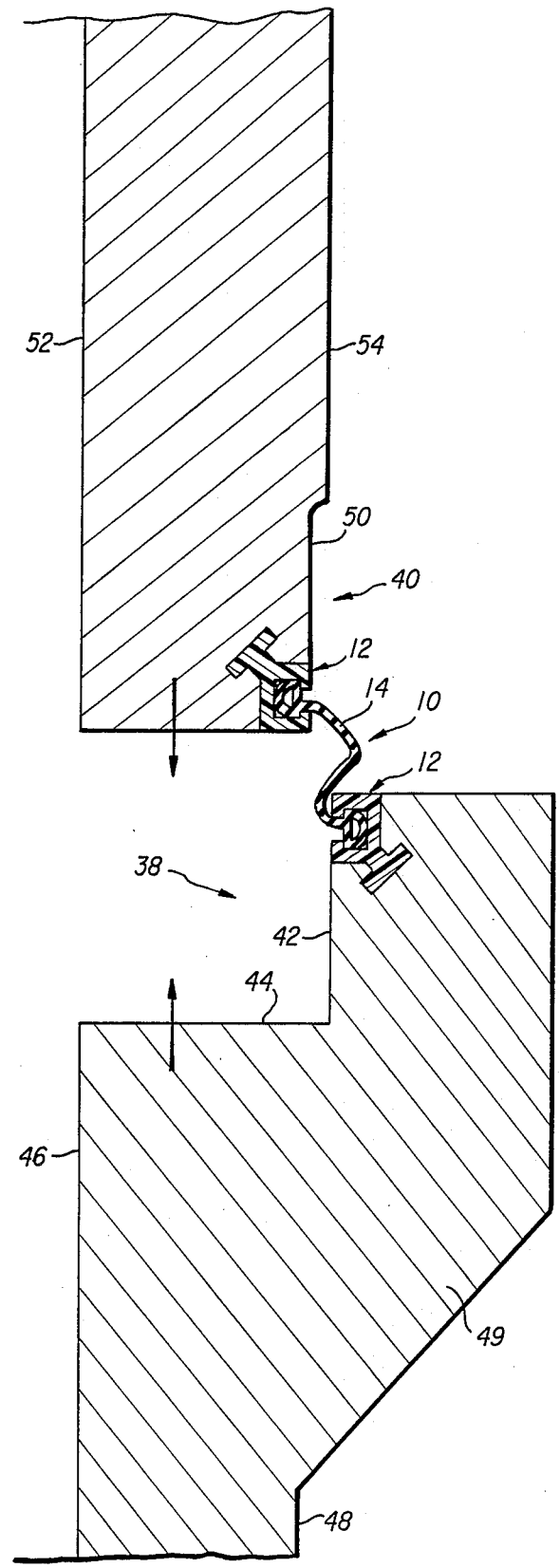

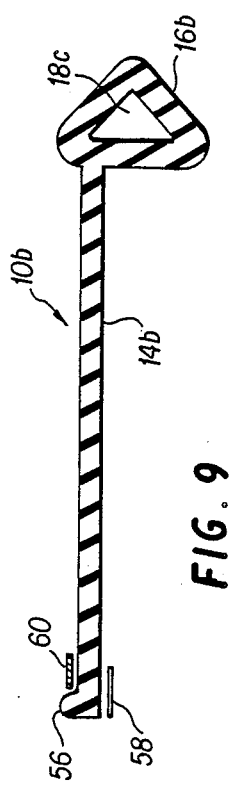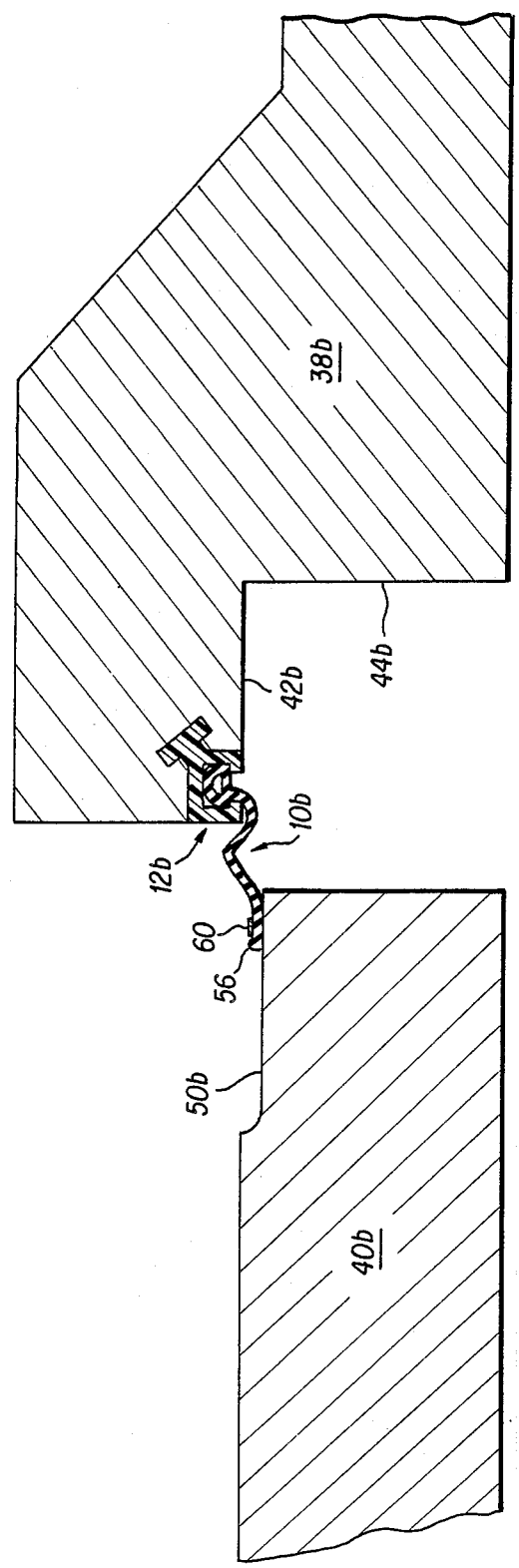

SEALING GLAND CONSTRUCTION FOR USE IN HYDRAULIC UNIT JOINTS

This invention related to a sealing gland construction for use in connection with hydraulic unit joints and, more particularly, to such a sealing gland construction which constitutes an internal sleeve gasket and which remains fluid tight even in the event of a slight discoupling of the joint.

BACKGROUND OF THE INVENTION

Heretofore it has been known to utilize sealing glands for various types of pipe joint constructions. These sealing glands which are customarily made from elastomeric material initially function very well in both low pressure environments, such as 15-20 psi, and in high pressure environments of 50 or more psi if care is taken to ensure close tolerances and smooth surfaces through lining of the jointing area.

However, problems occur when the elastomeric material ages and takes a permanent set and when slight or major separation of the adjoining conduits occurs over time because of settlement, vibration, tensile forces and other disturbances. When separation occurs the gasket is backed out in the joint area. Frequently, the spigot end has a slight taper and this may accelerate the separation. If the gasket has taken a compression set or the adjoining conduits have separated significantly, the fluid begins to leak at the joint. In cases when the conduit is lain in or supported by a medium such as soil, the leakage wets the soil in the joint area, dissolves it, and transports it away. This creates a washout situation which further exacerbates the disjointing condition, causing increased leakage and more severe disjointing or uncoupling.

A different type of disadvantage results when surface roughness or discontinuities of the interior surface of the conduit occasionally occur in several joints out of a number of joints and permit leakage of a small amount of material. For example, when used as a water line or sewerage line and the line is tested with air or water, the joint may fail or be considered marginal, when concrete pipe is used as the conduit material as compared to the smoother walls obtained for extruded plastic pipe.

Historically, when the conduit is pipe and the fluid is water, repeated occurrences have shown that even minor leakage can wreak havoc over long periods of time. When the intended use is a water line, sewerage line or disposal line, even minor leakage cannot be tolerated. While simple compression type gaskets may be watertight for several years, the invention of the present invention is intended to remain absolutely watertight for 20-60 years, with the ability to continue performing even with differential settlement of the conduit. The need for this reliability will be appreciated when it is considered that many conduits are placed under pavements, sidewalks, parking lots, and buildings where repair of the conduits is extremely expensive and disruptive.

SUMMARY OF THE INVENTION

In accordance with the present invention, the foregoing difficulties and shortcomings of the known prior art are effectively overcome. In particular, a sealing gland construction for hydraulic conduits is provided which has the ability to remain fluid-tight under considerable pressure and in the event of slight discoupling or uncoupling of the joints. A sealing gland is employed which has a first enlarged head that extends perimetrally around an inner wall portion of a female or bell end of a pipe and which has a second enlarged head that extends perimetrally around an exterior wall of a male, tongue or spigot end of another pipe used to effect a joint. The compressibility of the enlarged heads is enhanced by providing each of them with one or more longitudinally extending apertures. The sealing gland conforms in size and shape to the hydraulic conduit. Therefore, for a circular conduit, the sealing gland is a circular cylinder.

The gland is made from a preformed, elastomeric material that is extruded or molded in sheet form and formed into a gasket which provides an airtight and fluid-tight seal capable of preventing leakage of air or fluid under considerable pressure through the joints of hydraulic conduits. Each side of the extruded or molded heet has an enlarged bulb or head which allows compression and insertion into a receptacle formed in the female and male ends of the conduits. After insertion into each receptacle, each bulb or enlarged head is of such a size as to remain in compression both vertically and horizontally. An adhesive glues the sealing gland within each receptacle. The pressure caused by the compression of the bulb or enlarged head within the receptacle which is made of a compatible plastic and/or elastomer ensures good adhesive properties between the sealing gland and the receptacle.

The receptacle units are molded or preformed from an elastomeric or plastic material of sufficient rigidity to maintain its shape and retaining ability under pressure and stress. The receptacles are of the exact size and shape as the hydraulic conduit. When preformed, the ends of the receptacles are glued so that a complete unbroken circuit is formed. In the assembled position, the male end of one pipe and its associated enlarged head receiving receptacle are inserted into the female end of an adjacent pipe past its enlarged head receiving receptacle to effect a joint having a fluid seal for these pipes which remains sealed even in the event of a slight discoupling of the joint.

An important feature of the present invention is that the sealing gland constitutes an internal sleeve gasket. Thus, in its final position it is encased within two adjoining pipe walls where it is unexposed and is protected from puncture and attack from both within and outside the pipe.

The sealing gland constructions of the present invention are applicable to bell and spigot joints, tongue and groove joints, as well as in pipes of differing geometric shapes such as those which are rectangular, circular, elliptical, arch, and flat base. In addition, they can be used in hydraulic units which connect into collectors such as catch basins and manholes.

The inherent advantages and improvements of the present invention will become more apparent upon reference to the following detailed description of the invention and by reference to the accompanying drawings wherein:

FIG. 1 is a fragmentary elevational view taken in vertical cross section showing a portion of a sealing gland and a receptacle therefor;

FIG. 2 is a fragmentary elevational view similar to FIG. 1 but showing the sealing gland partially inserted into the receptacle;

FIG. 3 is a fragmentary elevational view similar to FIG. 1 but showing an enlarged head portion of the sealing gland fully inserted into the receptacle;

FIG. 4 is a fragmentary elevational view taken in vertical cross section illustrating a modified enlarged head for a sealing gland;

FIG. 5 is a fragmentary elevational view taken in vertical cross section illustrating the gland of FIG. 4 partially inserted into a receptacle;

FIG. 6 is a fragmentary elevational view similar to FIG. 5 but illustrating the enlarged head of the sealing gland of FIG. 4 fully inserted into the receptacle of FIG. 5;

FIG. 7 is a fragmentary elevational view drawn to a reduced scale illustrating the sealing gland of FIG. 1 inserted into the receptacle of FIG. 1 prior to the formation of a joint between the female and male ends of adjacent conduits;

FIG. 8 is a fragmentary elevational view similar to FIG. 7, but illustrating the female and male ends of the conduits in their approximate positions of an assembled joint;

FIG. 9 is an elevational view, taken in vertical cross section, of a modified sealing gland; and FIG. 10 is a fragmentary elevational view taken in vertical cross section, illustrated with the gland of FIG. 9 prior to encapsulating the gland between the walls of the pipes.

DETAILED DESCRIPTION OF THE INVENTION

Referring now to FIG. 1 of the drawings, there is illustrated a sealing gland indicated generally at 10 and a receptacle therefor indicated generally at 12. Sealing gland 10 has a central web portion 14 which extends between enlarged head portions at either end thereof such as is shown in FIGS. 7 and 8 with one enlarged head 16 being shown in FIG. 1. In the formation of the sealing gland 10, such as by extrusion, an aperture 18 is formed within the enlarged head to permit the head to be compressible and thereby to be received within receptacle 12 in the manner shown pictorially at FIGS. 2 and 3.

Pairs of receptacles 12 cooperate to receive the enlarged heads of sealing gland 10 in the manner shown in FIGS. 7 and 8. Each receptacle 12 comprises a pair of opposed side walls 20, 22, a bottom wall 24 and a restricted opening provided by inwardly extending flanges 26. Each container 12 has a centrally disposed interior cavity 28 into which the enlarged head 16 of the sealing gland is inserted.

Optionally, the receptacle 12 may also be provided with an external leg 30 and a pair of locking flanges 32, 34 which serve to lock the receptacle 12 within the bell and spigot portions of the mating conduits as is illustrated in FIGS. 7 and 8. An adhesive is illustrated at 36 in FIG. 2 applied to the walls of the interior cavity 28 to effect a seal for sealing gland 10. The adhesive may be applied to the interior of the cavity of the receptacle 12 or to the exterior of the enlarged head 16 or to both the enlarged head and the interior cavity of the receptacle 12.

Referring now to FIGS. 4, 5, and 6, there is illustrated another embodiment of a sealing gland indicated generally at 10a with a slightly modified receptacle indicated generally at 12a. In this embodiment, the enlarged head 16a is provided with a pair of apertures designated 18a, 18b. This construction provides somewhat more flexibility for the enlarged head ensuring that it will pass through the restricted area formed by inwardly extending flanges 26a into the interior cavity 28a. The receptacle has side walls 20a, 22a and a bottom wall 24a, but does not have the locking feature provided by flanges 32, 34 extending from leg 30 in the previous embodiment. An adhesive is shown at 36a on the interior cavity 28a, but could be applied exteriorly of the enlarged head 16a or to both the enlarged head and the interior cavity. In both forms of the invention, the enlarged head continues to remain in compression both vertically and horizontally within its receiving receptacle.

Referring now to FIGS. 7 and 8, the method of assembly of the pipes or conduits in order to effect a fluid type seal is illustrated. FIG. 7 illustrates a female or bell end indicated generally at 38 for a first conduit or pipe and a male, tongue or spigot end indicated generally at 40 for a mating conduit for a pipe. The pipes are being moved toward each other as indicated by the arrows in FIG. 7 prior to reaching the closed joint position shown in FIG. 8. At the female end of the pipe shown in the lower position there is shown an inner wall 42 and a horizontally extending shoulder 44 which extends inwardly from the inner wall of the bell ended pipe with the outer wall 46 being shown at 48 and a thickened end portion at 49. The male ended pipe or conduit has a relieved portion 50 which may be tapered with the pipe having an inner wall at 52 and an outer wall at 54. It will be seen that the receptacles are positioned adjacent the outer ends of the female end and male end respectively, so that as the pipes are moved from the FIG. 7 to the FIG. 8 position, the receptacle in the male end moves past the receptacle in the female ended pipe to effect a joint having a fluid seal which remains sealed even in the event of a slight discoupling or uncoupling of the joint.

To form a joint for a circular conduit, a receptacle is formed into, or when preformed, passed into the male and female ends of each conduit. The adhesive is supplied as has been noted, either to the inside of the receptacle or to the heads of the sealing gland or to both. The enlarged ends of the sealing glands are inserted into the receptacles for the male and female ends of the adjoining hydraulic conduits. The conduits are pushed to closure so that the joint is sealed with the sealing gland which is adhered to both ends of the hydraulic conduits.

Referring now to FIGS. 9 and 10, there is illustrated a further modification of the present invention. In particular, a sealing gland 10b is shown having a central web portion 14b having an enlarged head 16b at one end only with an aperture therein at 18c to facilitate easy insertion into receptacle 12b in FIG. 10 which is completely similar to receptacle 12 in the embodiment of FIGS. 1–3.

At the other end, however, sealing gland 10b is a smooth cylinder for a circular unit with a retaining knob provided at 56 in order to provide a retaining abutment for a metal band 60 that surrounds or encircles the end of gland 10b that is secured to the male, tongue or spigot end 40b. An adhesive 58 is interposed between the smooth inner wall of gland 10b, opposite retaining knob 56, and relieved portion 50b. The female or bell end 38b has an upstanding inner wall 42b and a shoulder 44b so as to receive the male, tongue or spigot end of the pipe in the manner shown by the direction arrows in FIG. 7 until a position similar to FIG. 8 is reached by the members illustrated in FIG. 10. Thus, a fluid seal is established in which the sealing gasket is encased between the walls of the pipes and which remains sealed even in the event of a slight discoupling of the joint.

While the invention has been illustrated and described with respect to preferred embodiments thereof, it will be recognized that the invention may be otherwise variously embodied and practiced within the scope of the claims which follow.

What is claimed is:

1. A sealing gland construction for use in connection with hydraulic unit joints which comprises:
   a. a first receptacle received within an inner wall portion of a female end of a pipe and extending perimetrally around within said female end,
   b. a second receptacle received within an exterior wall of a male end of another pipe and extending perimetrally around said male end,
   c. a sealing gland member made of elastomeric material having an enlarged and compressible head at each end of said sealing gland,
      (1) said sealing gland having one enlarged end received in said first receptacle and extending for the perimetral length thereof and its other enlarged end received in said second receptacle and extending for the perimetral length thereof,
   d. said male end and its second receptacle being inserted into said female end past said first receptacle to effect a joint wherein said sealing gland is encased within the walls of said pipes and wherein a fluid seal is established between said female and male pipes which remains sealed even in the event of a slight discoupling of said joint.

2. A sealing gland construction as defined in claim 1 wherein said enlarged heads of said sealing gland are adhesively secured to their respective first and second receptacles.

3. A sealing gland construction as defined in claim 1 wherein said enlarged heads of said sealing gland are preformed and of such a size so as to be maintained under compression within said receptacles both vertically and horizontally.

4. A sealing gland construction as defined in claim 1 wherein said enlarged heads of said sealing gland are preformed with longitudinally extending apertures.

5. A sealing gland consturction as defined in claim 1 wherein said first and second receptacles are formed with a restricted entrance neck to lock said enlarged heads of said sealing gland in place after insertion through said entrance neck.

6. A sealing gland construction as defined in claim 1 wherein said receptacles are provided with flange means to lock said receptacles into said female and male ends of said pipes.

7. In a sealing gland construction for use in connection with hydraulic unit joints formed between two concrete pipe members one of which is formed with a male end member and the other of which is formed with a cooperating female end member, the improvement which comprises:
   a. a receptacle formed from elastomeric material and having a portion adapted to receive a sealing gland member which is also formed from elastomeric material.
      i. said receptacle being received within an inner wall portion of said cooperating female end member and extending perimetrally around within said female end member,
      ii. said receptacle including means externally of its gland receiving portion including at least one protruding portion to lock said receptacle to said female end member.
   b. said sealing gland member having an enlarged and compressible head at one end thereof which is received and compressed within said receptacle and which extends for the perimetral length thereof,
   c. said portion of said receptacle for receiving said enlarged head of said sealing gland being sized with respect to said enlarged head to maintain said enlarged head in compression both vertically and horizontally prior to the assembly of said male and female members and irrespective of tolerances between said male and female members,
   d. said male end member having the other end of said sealing gland secured adjacent said male end with the point at which it is secured being inserted into said female end past said receptacle to effect a joint wherein said sealing gland is encased between the walls of said pipes and wherein a fluid seal is established between said cooperating male and female ends of said pipes which remains sealed even in the event of a slight discoupling of said joint.

8. A sealing gland construction as defined in claim 7 wherein said other end of said sealing gland is adhesively secured to a relieved portion of said male end.

9. A sealing gland construction as defined in claim 7 including clamping means on said sealing gland to clamp said sealing gland to said male end.

10. A sealing gland construction as defined in claim 9 wherein said sealing gland is provided with an abutment member to retain said clamping means on said sealing gland.

11. A sealing gland construction as defined in claim 9 wherein said male end is provided with a relieved portion and which includes adhesive means between said other end of said sealing gland and said relieved portion of said male end to secure said sealing gland to said male end.

* * * * *